March 17, 1959     H. S. KOLETSKY     2,877,650
SELF-BALANCING TEMPERATURE RESPONSIVE SYSTEM
Filed June 6, 1955     2 Sheets-Sheet 1
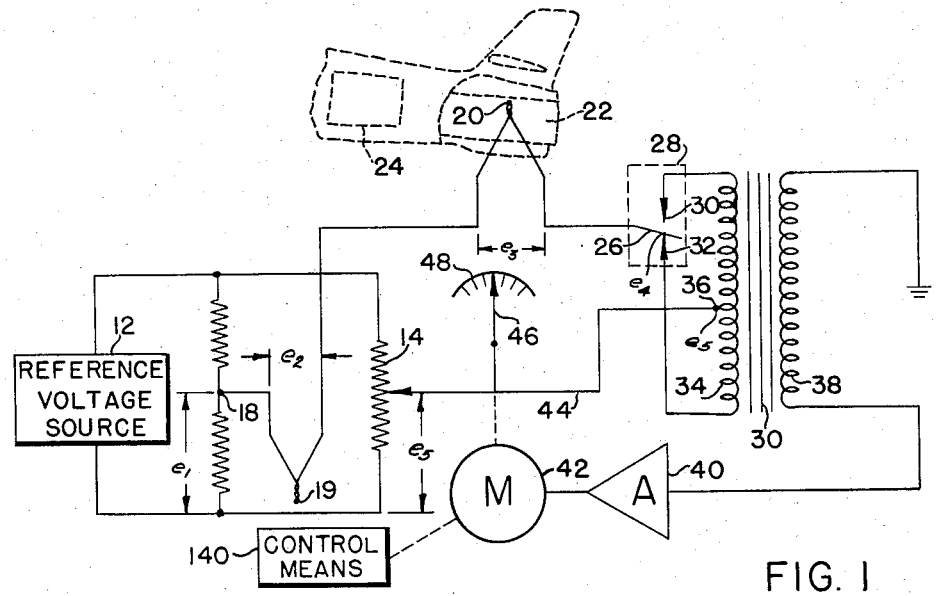
FIG. 1
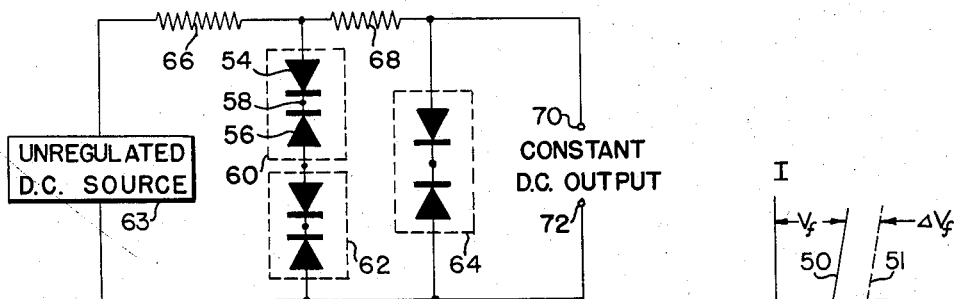
FIG. 2
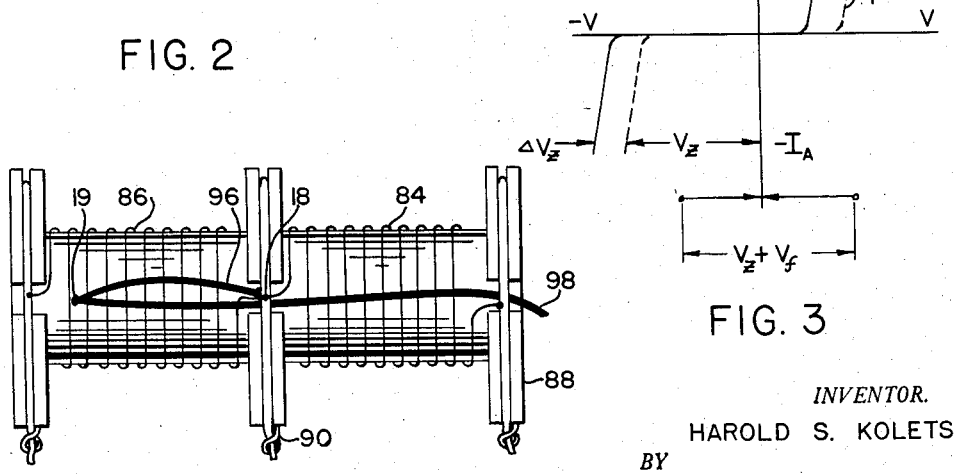
FIG. 3
FIG. 5
*INVENTOR.*
HAROLD S. KOLETSKY
BY Leonard H. King
AGENT March 17, 1959     H. S. KOLETSKY     2,877,650
SELF-BALANCING TEMPERATURE RESPONSIVE SYSTEM
Filed June 6, 1955     2 Sheets-Sheet 2

INVENTOR.
HAROLD S. KOLETSKY
BY
Leonard H. King
AGENT

United States Patent Office 2,877,650
Patented Mar. 17, 1959

2,877,650
SELF-BALANCING TEMPERATURE RESPONSIVE SYSTEM

Harold S. Koletsky, Jackson Heights, N. Y.

Application June 6, 1955, Serial No. 513,312

4 Claims. (Cl. 73—360)

This invention relates to improved temperature indicating systems and in particular to such systems of the self-balancing type employing self-contained voltage reference sources.

Many modern aircraft employ jet engines as the propulsion means. The life and performance of jet engines are directly affected by the temperatures of their gases. The maximum allowable temperature is one of the factors which determine the maximum available thrust. Therefore, it is of prime importance that the operating temperature be indicated to a high degree of accuracy in order to obtain maximum thrust without engine damage caused by overheating.

In the past, in-flight measurements of these temperatures were made with a thermocouple and galvanometer. Devices of this type, however, are at their best, subject to serious uncertainties, with errors under some conditions as great as 50° C. For modern jet aircraft it is desirable and often necessary to have an instrument with a maximum error of 5° C. This accuracy must be maintained over the full range of operating conditions encountered in aircraft.

Although thermometers capable of the required accuracy exist for industrial purposes, they are, in general, not suited for aircraft applications because of their size, weight, and inaccuracy when subjected to highly variable environmental conditions and extremes of vibration and acceleration forces associated with aircraft operations.

In addition to the accuracy requirements, a suitable device would have to provide easy readability, low system weight, compatability with present power plant temperature probe installations so as to permit equipping of existing aircraft and long service life.

It is accordingly a primary object of this invention to provide an accurate temperature measuring apparatus.

A further object of this invention is to provide a compact light weight temperature measuring apparatus.

Another object of this invention is to provide a thermocouple type temperature measuring system which will operate with the thermocouple connected to a "ground" point.

A particular object of this invention is to provide an apparatus suitable for measuring exhaust gas temperatures of a jet engine.

Another object of this invention is to provide an apparatus for measuring temperatures of gases.

A different object is to provide a temperature compensated thermocouple cold junction.

Other objects and a fuller understanding of the invention may be had by referring to the following description and claims, taken in conjunction with the accompanying drawings in which:

Figure 1 is a simplified schematic showing of the apparatus of this invention.

Figure 2 is a schematic showing of a constant voltage reference source.

Figure 3 is a graphical representation of a family of current vs. voltage curves for a silicon diode at different temperatures.

Figure 5 is a pictorial representation of a temperature compensated thermocouple cold junction.

In the various figures like reference numbers refer to like elements.

Figure 4:
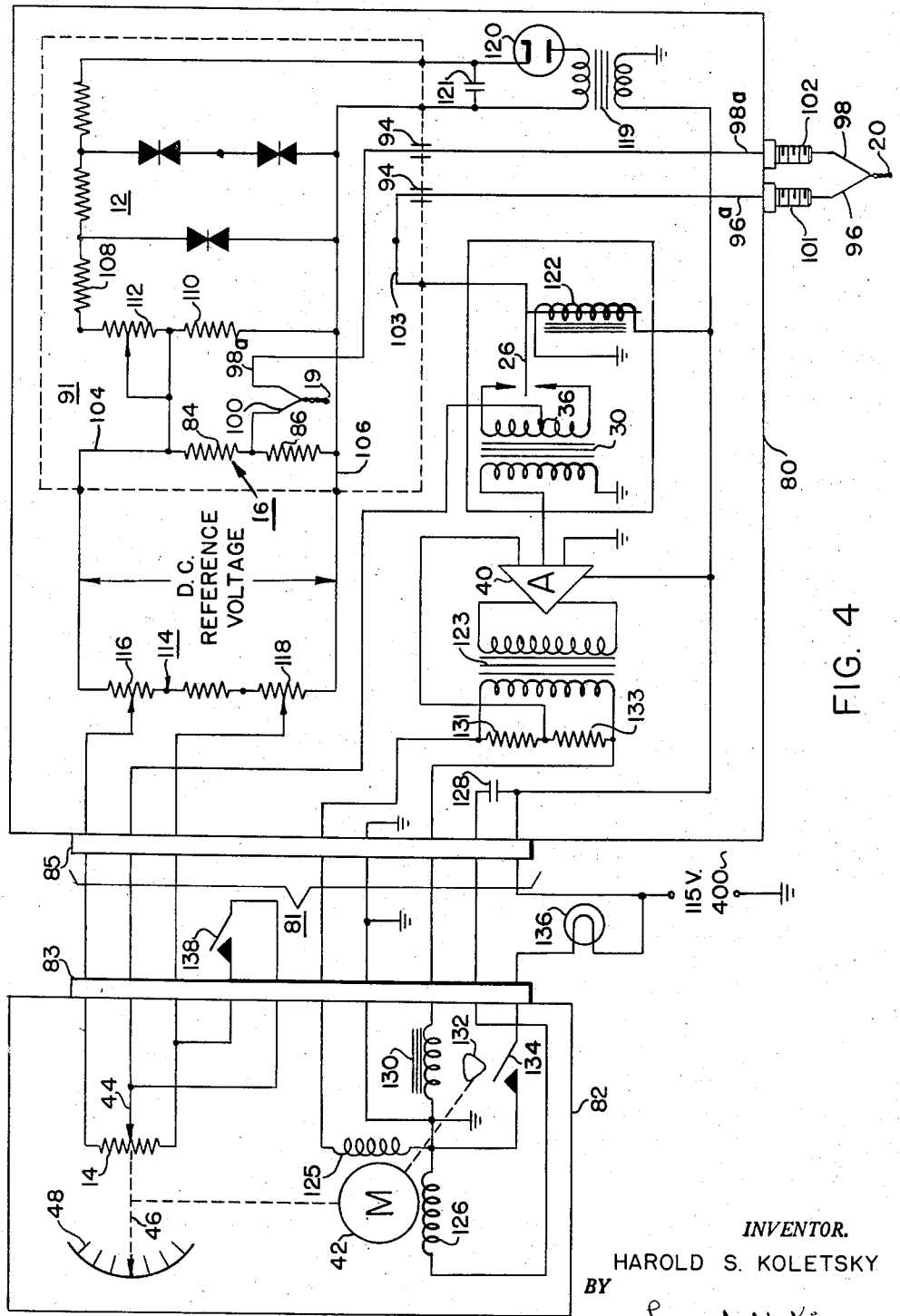
Figure 4 is a schematic showing of a temperature measuring apparatus of this invention.

Simply stated, the apparatus of this invention includes a novel and highly accurate reference voltage source which is applied to a calibrated potentiometer, a thermocouple is positioned at a location whose temperature is to be sensed so that an E. M. F. is generated which is related to the temperature being sensed, and means for automatically varying said potentiometer until the output voltage of the potentiometer is exactly equal to the E. M. F. of the thermocouple. Since the potentiometer is calibrated its setting is indicative of the temperature being sensed.

For purposes of illustration a simplified version of the apparatus is shown in Figure 1 wherein reference voltage source 12, described more fully hereinafter, energizes potentiometer 14 and voltage divider 16 which provides means for compensatng for the thermocouple cold junction 19.

The voltage, $e$, at junction 18 plus the thermal E. M. F., $e_2$, generated by the cold junction 19 and the thermal E. M. F., $e_3$, produced by the hot junction 20 shown inserted in the exhaust 22 of jet engine 24, results in a voltage $e_4$ appearing at movable reed 26 of 400 cycle A. C. chopper 28. The chopper 28 alternately connects end terminals 30 and 32 of transformer primary 34. Whenever the voltage, $e_5$, at center tap 36 differs from voltage $e_4$ there will be a flow of current through primary 34 and in turn through transformer secondary 38. The signal is amplified by amplifier 40 and in turn causes motor 42 to actuate movable arm 44 of potentiometer 14 in a direction tending to vary the voltage $e_5$ until it is equal to $e_4$. When voltage $e_4$ is equal to voltage $e_5$ no signal will be applied to motor 42 and the system will be at rest. Motor 42 also drives an indicator pointer 46 which in combination with scale 48 provides an indication of temperature measured by probe 20.

While I have described the apparatus as applied to the determination of the jet exhaust temperatures it is to be understood that it may be applied to measuring of other temperatures such as turbine inlet temperatures.

The provision of a constant voltage source which may be operated from conventional aircraft power sources creates problems for such sources often experience voltage variations of ±10% of nominal. A suitable voltage source disclosed hereinafter is claimed in my copending application entitled "Reference Voltage Source," S. N. 513,311, filed concurrently herewith and assigned to the assignee of the instant invention.

This reference voltage source is shown by the circuit of Figure 2 wherein silicon diodes of the low zener voltage type are employed. Such diodes of the single crystal silicon junction type as supplied by the National Semiconductor Products Division of National Fabricated Products, Inc. of Evanston, Illinois, under their number A6C–6.

These diodes have the inherent characteristics of relatively low temperature coefficients of forward and reverse (or zener) voltage drop, as well as an extremely low dynamic resistance (approximately ten ohms). The temperature characteristics are such that a change of ambient temperature T to $T_1$ will result in the shift of characteristic curve 50 (Figure 3) as shown by dashed line 51 which corresponds to an increase in forward voltage drop of $\Delta V_f$ and a decrease in the zener voltage of $\Delta V_z$. By choosing a pair of diodes having a matched $\Delta V_z$ and $\Delta V_f$ change with change in temperature and connecting them so that when one conducts in the forward direction and the other in the reverse direction, the voltage drop across the pair $V_z+Z_f$ will be essentially independent of temperature changes. Diodes 54 and 56 are connected in this fashion. As a practical matter both diodes may be contained in a single envelope so as to eliminate intermediate connection 58, thus producing a double anode diode 60.

In series with double diode 60 there is provided a second double diode 62. The pair of double diodes 60 and 62 are isolated from a source of unregulated D. C. potential 63 by means of resistor 66. Resistor 68 in turn isolates double diode 64 from diodes 60 and 62. Because of the voltage drop across resistor 68 the pair of double diodes 60 and 62 are required to provide a sufficient voltage across diode 64 to cause voltage breakdown of the diode. It should be appreciated that in place of the pair of diodes 60 and 62 a single double diode having a higher voltage breakdown level may be employed. In a similar fashion a series of resistance-diode sections may be cascaded to provide an even higher degree of output voltage regulation. It is to be understood that each preceding section requires a greater voltage output and therefore a typical multi-section unit would employ in cascade: four, three, two and finally one double-diode unit.

A two section unit as shown in Figure 2 will provide a voltage output at terminals 70 and 72 that is constant within ±0.05% for a 10% variation of the D. C. source 63. Isolating resistors 66 and 68 are of zero temperature coefficient type. The resistors should preferably have a resistance of about twenty to fifty times the dynamic resistance of the diodes. The exact value depends on the characteristics of the particular diodes employed and may be readily calculated in accordance with conventional practice so that the current carrying capabilities of the diodes are not exceeded.

In an actual aircraft installation the equipment comprises three principal separated units. They are thermocouple 20, which may be several junctions in parallel, an amplifier, D.-C. reference voltage source and modulator unit in a suitable housing 80, and a second housing 82 containing an indicator pointer 46, scale 48, rebalancing servo motor 42 and rebalancing potentiometer 14. Housing 82 is normally mounted on the aircraft instrument panel. An alternative construction would be to combine the components of both housings into one case for mounting behind the instrument panel of an aircraft with but the indicator scale and pointer exposed cable 81 and connectors 83 and 85 interconnect the units.

The thermocouple may be regarded as a variable potential source whose magnitude is dependent on the temperature at its two terminations, i. e. the hot junction 20 and the cold junction 19. For a given hot junction temperature, any variation of the cold junction temperature will result in a change in developed potential. Therefore, the cold junction must be either compensated for or held constant so that the developed voltage is a measure of the hot junction temperature only. Temperature compensation of the cold junction 19 is accomplished by utilizing a pair of resistors, 84 and 86, one sensitive, the other stable with temperature. The stable element 84 provides an essentially constant current to the other resistor 86 and thus the voltage across the temperature-sensitive one is determined by its temperature coefficient of resistance, which has been selected for close similarity to the output vs. temperature curve of Chromel-Alumel. In this case an alloy of approximtely 28% iron and 72% nickel was chosen for the temperature-sensitive resistor 86 and an alloy of approximately 75% nickel, 5% aluminum and iron, and 20% chromium for the temperature-stable resistor 84. Both compensating resistors are wound on the same bobbin 88 as shown in Figure 5 with the cold junction thermocouple 19 embedded under the wire 86 that is compensating it. A copper support band 90 is soldered to wires 84 and 86 to form junction 18. Particular care should be taken in the construction of the amplifier to insure that errors arising from the formation of secondary thermocouple junctions are eliminated. In order to accomplish this, a "thermal sink" 91 is utilized which consists of a small hermetically sealed can filled with a low viscosity silicone oil. The oil has good heat conductivity, and, because of its low viscosity, allows free convective heat transfer throughout the volume of oil. Thus, all parts of the oil are at substantially the same temperature. The hermetic seal terminals 94 are of the hollow tube type which allow thermocouple metal wires to be inserted into the sink without the formation of secondary thermo-junctions.

It will be noted that the Chromel and Alumel thermocouple lead wires 96 and 98 from the measuring thermocouple probe 20 are brought into the Amplifier housing 80 through Chromel and Alumel studs, 101 and 102 respectively. Thus, no secondary thermocouple is formed at this lead-in point. Inside the Amplifier housing 80 the thermocouple signal paths are continued by Chromel and Alumel lead wires 96a and 98a. Alumel lead 98 enters thermal sink 91 and joins Chromel wire 100 to form cold junction 19. In turn Chromel lead 100 contacts resistors 84 and 86 which in turn form secondary junctions with copper leads 104 and 106. The Chromel thermocouple signal lead 96a is brought from the Chromel connector stud 101 into the thermal sink 91 where its connection to a copper lead 103 is also made. The thermal sink 91 is the only place in the whole system where the thermocouple leads are permitted to contact a dissimilar metal. Since the temperature throughout the thermal sink 91 is the same, the potentials developed by these secondary Chromel-copper junctions are equal and cancel each other exactly.

A constant voltage source for the cold junction compensating resistors is provided by D.-C. reference source 12. Zero temperature coefficient resistors 108 and 110 and rheostat 112 serve as an adjustable voltage divider. Rheostat 112 permits presetting at the factory of the voltage reference source 12 to a standard nominal output voltage. Potentiometer 118 provides means to cancel out the resultant of cold junction voltage ($e_2$) and cold junction compensator voltage ($e_1$). Accordingly system balance is achieved when the voltage across the rebalance potentiometer 14, as measured at movable arm 44, equals that of the thermocouple measuring junction 20.

Potentiometer 14 is connected across resistance voltage divider 114 which includes potentiometer 116, for adjustment of the system for proper high temperature indication and potentiometer 118 for adjustment of the system for low indication.

Rectifier 120 rectifies available nominal 400~A.-C. power supplied by transformer 119 to provide a D.-C. input to the constant voltage source 12. Capacitor 121 provides filtering action.

The use of transformer 119 serves to electrically isolate the reference voltage source so that in the event thermocouple probe 20 is accidentally grounded, as to the airframe, the apparatus will not be rendered inoperative.

As has been explained earlier in discussing Figure 1 the voltage, $e_5$, appearing at the movable arm 44 of potentiometer 14 is applied to center tap 36 of transformer 30. $e_4$ is the resultant voltage of the series circuit comprising, $e_1$, the cold junction compensator voltage; $e_2$, the cold junction thermocouple; and $e_3$, the hot or sensing thermocouple probe. Whenever $e_4$ differs from $e_5$, an A.-C. signal appears across secondary 38 due to action of vibrating reed 26 which is electro-magnetically actuated by means of solenoid 122.

The signal is applied to servo amplifier 40 and in turn to output transformer 123 and then to winding 125 of servo motor 42. The other winding 126 is energized through phase shifting capacitor 128.

A rate damping signal may be derived from motor 42 through inductance 130 and resistors 131 and 133 which are connected to form a 4-arm bridge the output of which is proportional to the motor speed and is used to damp the overall system.

Cam 132 coupled to motor 42 may be used to actuate switch 134 which completes a circuit to energize signal lamp 136. This lamp may be used to indicate excessive temperatures or by proper cam shape to indicate suitable operating range.

Test switch 138, when depressed shorts out a section of potentiometer 14 causing an upscale movement of indicator 46, thus serving as a functional check on the operation of the instrument during pre-flight inspection.

It is pointed out with particularity that a feature of this invention is the provision of a temperature sensitive resistor 86 in series with thermocouple cold junction 19 so that as the voltage of the cold junction increases with temperature there occurs a compensating increase of voltage drop across resistor 86 so that the total voltage across resistor 86 and thermocouple cold junction 19 remains constant despite changes in ambient temperature. Resistor 86 is also common to a circuit which includes constant voltage source 12 which source provides the regulatory current for the resistor 86.

The apparatus disclosed herein may be used to measure temperatures for other than aircraft applications.

The apparatus may also be employed as a control means. By way of example, motor 12 may be coupled to control means 140. Control means 140 may be a valve for controlling fuel flow or engine nozzle area so as to keep a jet engine automatically operating at maximum efficiency. The control means could be employed for a number of other purposes as for example, in chemical process work for controlling the flow of materials in accordance with the temperature. A second potentiometer may be coupled to the motor as the control means 140, if electrical control is desired.

While I have disclosed the best mode presently contemplated for carrying out the invention it is to be understood that modifications may be made by those skilled in the art without departing from the spirit of the invention and therefore I wish to be limited only by the scope of the appended claims.

What I claim as new is:

1. A temperature responsive apparatus including a source of electrical energy comprising means to supply a D. C. potential; a resistor and a rectifier element in series connection, arranged to be energized by said source of electrical energy, said rectifier element comprising a pair of diodes, of the crystal semi-conductor type, provided with unlike electrodes arranged in series with each other so that one electrode of one diode is connected in juxtaposition with a like electrode of the other diode; means for producing a constant D. C. voltage from said D. C. potential connected in parallel with said rectifier element; a voltage divider network, including a resistor having a substantially zero temperature coefficient of resistivity in series so as to provide a common connection with a temperature sensitive resistor characterized by a temperature coefficient of resistivity substantially other than zero connected to said means for producing a constant D. C. voltage; a voltage comparison means arranged to have applied thereto a pair of voltages and which produces an output signal whenever said voltages differ; a potentiometer having end terminals and a movable tap, said end terminals being connected to said means for producing a constant D. C. voltage and said tap being connected to said voltage comparison means; a first thermocouple junction, consisting of a first and a second metal lead, so as to provide a lead of a first and a second polarity respectively; a second thermocouple junction consisting of leads formed of said first and said second metals so as to provide leads of a first and a second polarity respectively; means formed of said second metal connected between both said leads of said second polarity of said thermocouple junctions; means connecting said first polarity lead of said first thermocouple junction to said voltage comparison means; means connecting said first polarity lead of said second thermocouple junction to said temperature sensitive resistor at said common junction; motor means under control of said comparison means arranged to move said potentiometer movable tap in a direction tending to adjust the voltage of said movable tap so as to reduce the output signal from said comparison means and render said motor ineffective; and controlled means responsive to changes in temperature under the control of said motor means.

2. A temperature responsive apparatus including a source of electrical energy comprising means to supply a D. C. potential; a resistor and a rectifier element in series connection, arranged to be connected with said source of electrical energy, said rectifier element comprising a pair of diodes, of the silicon diode type, provided with unlike electrodes arranged in series with each other so that one electrode of one diode is connected in juxtaposition with a like electrode of the other diode; means for producing a constant D. C. voltage from said D. C. potential connected in parallel with said rectifier element; a first voltage divider, including a resistor having a substantially zero temperature coefficient of resistivity in series by means of a common connection with a temperature sensitive resistor, characterized by a temperature coefficient of resistivity substantially other than zero, said first voltage divider being connected to said means for producing a constant D. C. voltage; a voltage comparison means arranged to have applied thereto a pair of voltages and which produces an output signal whenever said voltages differ; a rebalance potentiometer having end terminals and a movable tap; a full scale and a low scale adjustment potentiometer each provided with end terminals and a movable tap; a second voltage divider network including said full and low scale potentiometers connected in series with said voltage reference source output means; means connecting said rebalance potentiometer and terminals to said full and low scale potentiometer movable taps; means connecting said rebalance potentiometer movable tap to said comparison means; a first thermocouple junction formed of leads composed of a first and a second metal and a second thermocouple junction formed of leads composed of the said first and second metals; means formed of said second metal connected between said second metal leads of said thermocouple junctions; means connecting said first metal lead of said first thermocouple junction to said voltage comparison means; means connecting said first metal lead of said second thermocouple to said first voltage divider common connection; motor means under control of said comparison means arranged to move said rebalance potentiometer movable tap in a direction tending to adjust the voltage of said movable tap so as to reduce the output signal from said comparison means and render said motor ineffective, and responsive means under control of said motor.

3. A temperature indicating system comprising in combination: a source of electrical energy comprising means to supply a D. C. potential; a resistor and a rectifier element in series connection connected to said source of electrical energy, said rectifier element comprising a pair of diodes, of the silicon diode type, provided with unlike electrodes arranged in series with each other so that one electrode of one diode is connected in juxtaposition with a like electrode of the other diode; means for producing a constant D. C. voltage from said D. C. potential connected in parallel with said rectifier element; a sensing thermocouple formed of two dissimilar metal leads joined in a common junction so as to provide a lead of a first polarity and of a second polarity, said sensing thermocouple being positioned in operative relationship with a temperature condition to be sensed; a reference thermocouple formed of two dissimilar metal leads, like that of said first thermocouple, joined in a common junction so as to provide a lead of a first polarity and of a second polarity; means electrically connecting said terminals of said second polarity; a transformer having a secondary winding and a primary winding provided with end terminals, said primary winding being additionally provided with a center tap; a rebalance potentiometer having end terminals and a movable tap; means connecting said potentiometer end terminals to said means for producing a constant D. C. voltage; means connecting said movable tap with said transformer center tap, so that said transformer is at the same potential as said potentiometer tap; a modulator provided with a movable contact arranged to alternately contact a pair of terminals connected to said transformer primary end terminals; a voltage divider network including a substantially temperature insensitive resistor and a temperature sensitive resistor connected in series with each other, so as to provide a common connection, and in series with said constant voltage source; means connecting said reference thermocouple lead of said first polarity to said voltage divider common connection; means connecting the said sensing thermocouple lead of said first polarity to said movable contact of said modulator; an amplifier for providing an output signal connected to said transformer primary winding; a motor under control of said amplifier arranged to move said potentiometer movable tap in a direction adapted to vary the voltage at said transformer center tap until the output signal from said amplifier is ineffective to actuate said motor; and indicating means under control of said motor.

4. A temperature responsive apparatus adapted to actuate a device in accordance with a temperature condition, comprising in combination: a source of electrical energy comprising means to supply a D. C. potential; a resistor and a rectifier element in series connection connected in parallel with said source of electrical energy; said rectifier element comprising a pair of diodes, of the silicon diode type, provided with unlike electrodes arranged in series with each other so that one electrode of one diode is connected in juxtaposition with a like electrode of the other diode; means for producing a constant D. C. voltage from said D. C. potential connected in parallel with said rectifier element; a voltage comparison means; a substantially temperature insensitive resistor and a temperature sensitive resistor connected in series so as to provide a common connection and a pair of end connections, said end connections being connected to said means for producing a constant D. C. voltage; a sensing thermocouple junction positioned so as to detect said temperature condition and a reference thermocouple junction each formed of a similar pair of unlike metal leads; one of said reference junction leads being connected to said common connection, the other of said reference junction leads being connected in series with the said lead of said sensing thermocouple of corresponding metal, the other of said sensing thermocouple leads being connected to said voltage comparison means; a potentiometer having a pair of fixed terminals, connected to said means for providing a constant voltage, and a variable tap connected to said voltage comparison means; and means to vary the position of said variable tap under the control of said voltage comparison means and to actuate said device.

References Cited in the file of this patent

UNITED STATES PATENTS

| | | |
|---|---|---|
| 2,025,534 | Sheard et al. | Dec. 24, 1935 |
| 2,153,922 | Green et al. | Apr. 11, 1939 |
| 2,447,338 | Hornfeck | Aug. 17, 1948 |
| 2,620,664 | Lodge | Dec. 9, 1952 |
| 2,704,822 | Miller | Mar. 22, 1955 |
| 2,742,786 | Lemmerman | Apr. 24, 1956 |

FOREIGN PATENTS

| | | |
|---|---|---|
| 934,388 | France | Jan. 10, 1948 |